(12) United States Patent
Hollander

(10) Patent No.: US 6,883,430 B2
(45) Date of Patent: Apr. 26, 2005

(54) METHOD OF DELIVERING ADVERTISING MATERIAL

(75) Inventor: Milton B. Hollander, Stamford, CT (US)

(73) Assignee: Omega Engineering, Inc., Stamford, CT (US)

( * ) Notice: Subject to any disclaimer, the term of this patent is extended or adjusted under 35 U.S.C. 154(b) by 183 days.

(21) Appl. No.: 10/391,736

(22) Filed: Mar. 19, 2003

(65) Prior Publication Data

US 2004/0241432 A1 Dec. 2, 2004

Related U.S. Application Data

(63) Continuation of application No. 09/069,440, filed on Apr. 29, 1998, now abandoned, which is a continuation-in-part of application No. 08/970,283, filed on Nov. 14, 1997, now abandoned.

(51) Int. Cl.[7] .............................. G09F 3/00; B41C 1/00
(52) U.S. Cl. .......................... 101/483; 40/312; 40/360; 229/87.18; 283/56
(58) Field of Search ................................ 101/483, 219, 101/226, 227; 283/67, 56, 79, 81, 100; 40/312, 360; 229/87.01, 87.06, 87.18, 638

(56) References Cited

U.S. PATENT DOCUMENTS

| | | |
|---|---|---|
| 1,609,923 A | 12/1926 | Wilson |
| 1,849,774 A | 3/1932 | Taylor |
| 4,557,971 A | 12/1985 | Williams |
| 5,567,514 A | 10/1996 | Gold |
| 5,624,751 A | 4/1997 | Spies et al. |
| 5,676,401 A | 10/1997 | Witkowski et al. |
| 5,911,442 A * | 6/1999 | Olson .......................... 283/36 |
| 6,308,990 B1 * | 10/2001 | Brick ........................... 283/79 |
| 6,364,990 B1 * | 4/2002 | Grosskopf et al. .......... 156/268 |
| 6,578,303 B2 * | 6/2003 | Richards ...................... 40/665 |
| 6,773,539 B2 * | 8/2004 | Mertens et al. ............. 156/277 |
| 6,810,802 B2 * | 11/2004 | Huang ........................ 101/328 |

* cited by examiner

*Primary Examiner*—Eugene H. Eickholt
(74) *Attorney, Agent, or Firm*—Kirkpatrick & Lockhart Nicholson Graham LLP; Anthony H. Handal

(57) ABSTRACT

A unique packaging method is disclosed. The method advertises products related to a product shipped in a box and comprises obtaining a box, placing a product in the box, and identifying a particular product category associated with the product being shipped in the box. This may be followed by obtaining an elongated flexible planar member having a width and a length substantially greater than the width, the planar member having an upper surface and a lower surface. The flexible planar member is provided with a layer of adhesive material deposited on and covering a substantial portion of the lower surface to form a packaging tape. The tape is imprinted with indicia comprising visually perceivable information to provide a purchaser with information relating to various products within the particular product category by disposing the information on the upper surface of the tape. The box is sealed with the tape. The method thus serves to particularly well-target advertising, as it is sent to consumers of known products. At the same time the invention provides the advantage of low-cost as compared to dedicated printed packages.

29 Claims, 8 Drawing Sheets

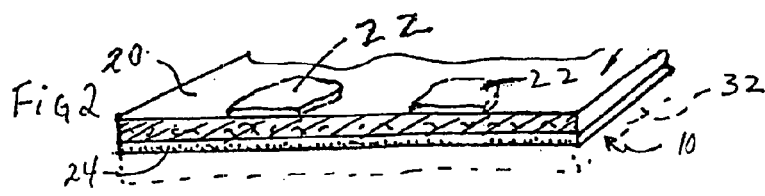
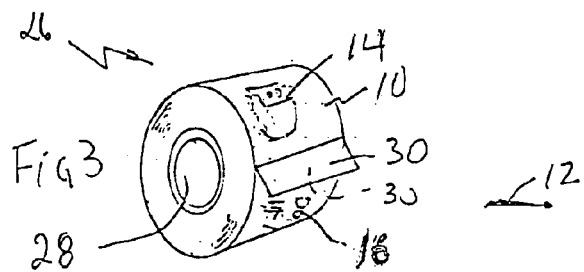
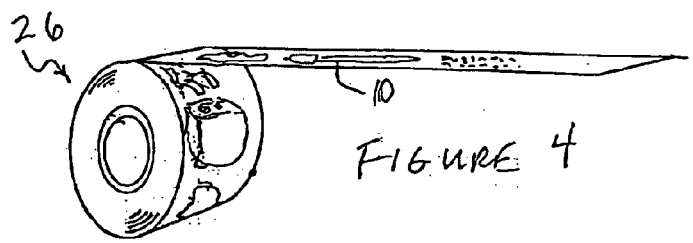
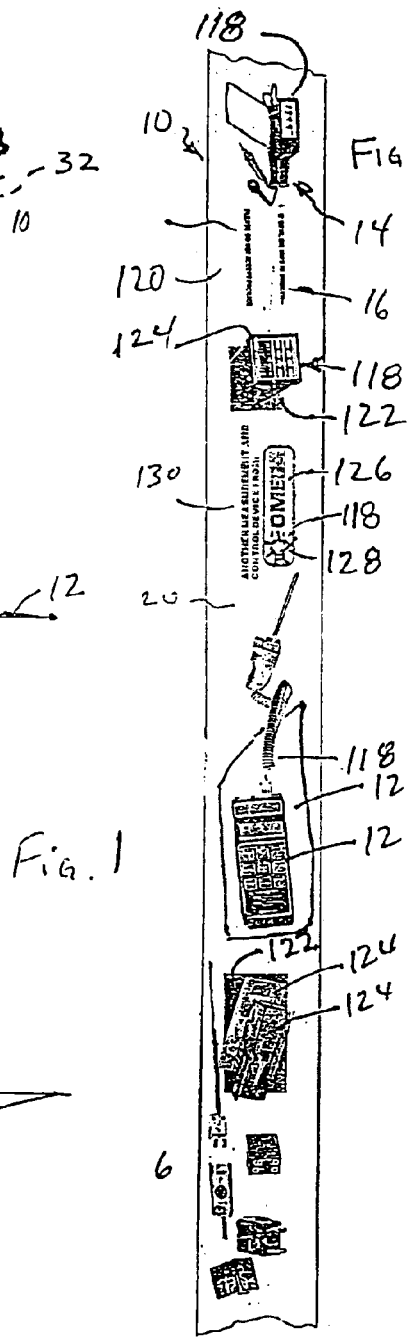

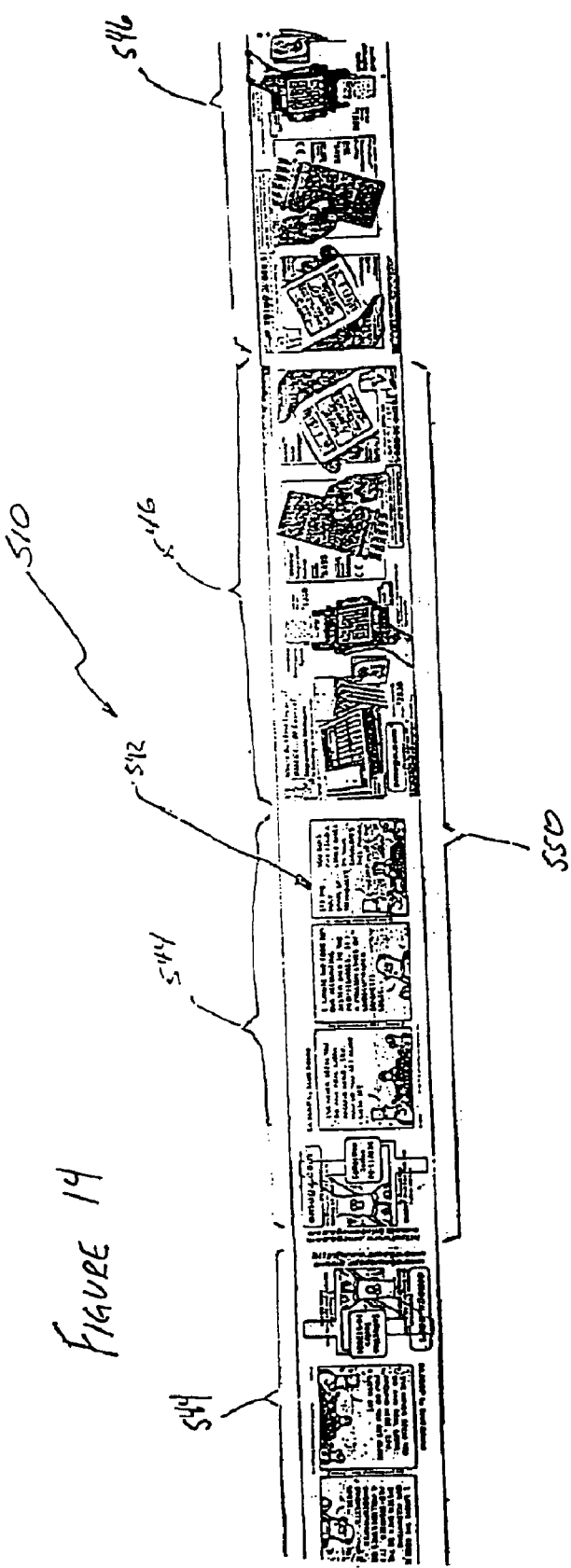

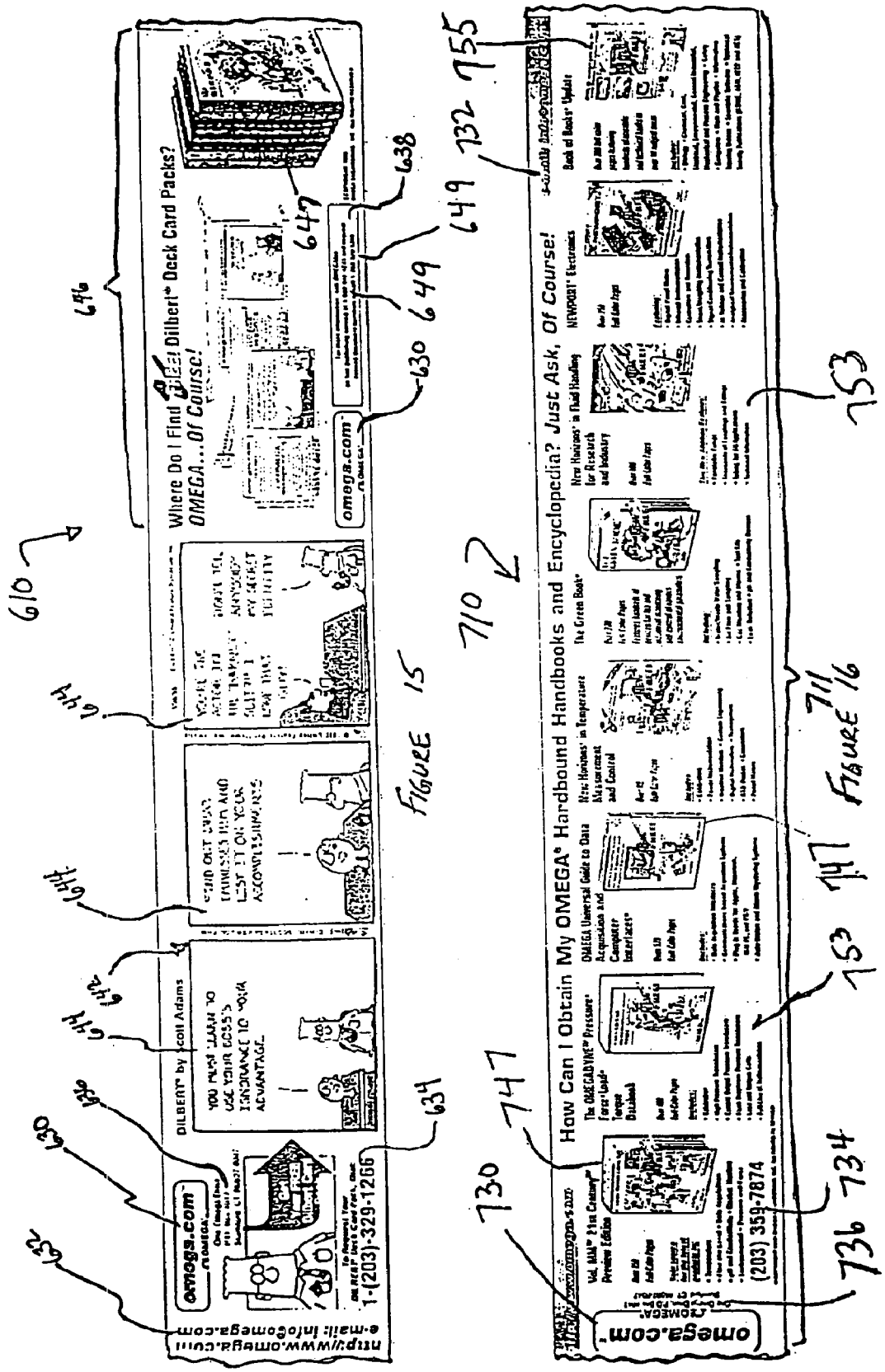

METHOD OF DELIVERING ADVERTISING MATERIAL

CROSS-REFERENCE TO RELATED APPLICATIONS

This application is a continuation of U.S. patent application Ser. No. 09/069,440 filed Apr. 29, 1998 and now abandoned which is, in turn, a continuation-in-part of U.S. patent application Ser. No. 08/970,283, filed Nov. 14, 1997 and now abandoned.

TECHNICAL FIELD

The present invention relates to an advertising method using packaging tape with advertising and other printed information disposed on the exterior of the tape.

STATEMENT REGARDING FEDERALLY SPONSORED RESEARCH OR DEVELOPMENT

Not Applicable.

BACKGROUND

Over the years, a wide variety of advertising methods employing graphic devices have been applied to packaging. Marks applied to packages include the trademark of a product contained within the package and are a common everyday experience. Examples include such diverse products as soft drinks, film, and cigars, all of which come in packages with their own particular type of markings.

In the most typical case, a cardboard package dedicated to a particular product is printed with information relating to that product. Thus, a package of film is printed with the number of exposures, the size of the frame, and the speed of the film. This information is valuable in the context of showing the contents of the box and provides for inventory control, advertisement of the mark of the maker, advertisement of the particular product enclosed, and so forth. Other related products may also be advertised on the box.

While there are a great many stock boxes available for packaging goods, because of the advantages associated with printed boxes dedicated to particular products, manufacturers almost always opt for a printed box. This is so even though such printed boxes are very expensive to manufacture, requiring such expensive tasks as the development of art suited to the box, and the use of a high quality material to make the box. For example, in a typical box of the corrugated cardboard type, the corrugated cardboard box would have an external veneer of high quality white paperboard laminated to the outside surface to receive the printing. Such paper board may be a coated stock and the box manufacturer may also apply a varnish to the surface to finish it.

While the finished product may be exceedingly attractive, the added costs associated with the use of higher quality materials, development of extensive amounts of color art, and finally the printing in full color of the boxes, make such packages a significant fraction of the product cost, as they often cost as much as five or ten times the cost of a plain box.

In the case of a corrugated cardboard box, which is typically of a size which results in a capacity of 1 to 20 cubic feet, the large size of the box presents a correspondingly large expense with respect to materials, art and printing plates. In addition to this, the thickness of the unprinted cardboard material presents special handling problems related to the necessity of keeping the material flat during printing, not degrading the corrugated cardboard structure, and running the printing machine at a relatively low speed which enables the consistent handling of a cumbersome piece of corrugated cardboard.

Indeed, because of the high cost of packages which include full color information, companies using these packages are often hesitant to discard them when products change or other things occur which require the labeling on the package be amended. Because of this, it is not unheard of to see packages on the shelves of stores which have stickers adhered over portions of their graphical or alphanumeric content for the purpose of covering incorrect data or putting correct or additional data on the box.

Such expedients are also resorted to when, even though the particular product involved and can easily support the economic costs associated with a box change, the change must be made promptly, and the expensive artwork, production tooling and scheduling, and so forth cannot be made quickly enough to accommodate the business needs associated with the change in packaging.

Because of these problems, numerous mechanisms have been utilized to avoid the delays and costs of printed packages. For example, food products are often sold in packages which are made of clear plastic and are marked with self-adhesive stickers made of paper or other similar material. However, this sort of approach looks odd when applied to other sorts of packages, such as corrugated cardboard cartons, opaque paperboard cartons, and other similar types of packages. In addition, the use of self-adhesive stickers also imposes significant additional costs, although the same are likely to be significantly less than the cost associated with custom full color product-specific packaging.

It is also known to apply graphic elements to boxes by printing these graphic elements on adhesive tape. Perhaps the most common of graphic elements which are imprinted on adhesive and non-adhesive members are package tampering warnings, such as "Do not use if seal is broken".

It is also known to apply decorative graphic elements to adhesive tape. Such decorative graphic elements may comprise geometric patterns, bright colors, holiday or other occasion thematic elements, alphanumeric indicators and the like.

SUMMARY OF THE INVENTION

The invention, as claimed, is intended to provide a remedy. It solves the problem of how to put information on a box without running into the problems and costs associated with a printed box. Moreover, the cost of extra elements, such as labels and stickers, is avoided. By utilizing the inventive adhesive tape, with information printed on the tape, a manufacturer can use the same type of plain corrugated box for all products, and achieve the same effect as if a printed box had been used.

The preferred embodiment of the present invention consists of a method using plain corrugated cardboard box which has been cut and folded in the conventional manner. The bottom and edges of the box are then secured by applying strips of the inventive tape printed with the desired information. After packing the box with the proper product and packing material, the top of the box can then secured by applying the inventive tape printed with the same or differing information. Information on the tape is keyed to the contents of the box in order to target advertising content.

The inventive method uses tape which is applied to the top, bottom and edges of the box is printed with various types of information, such as advertising for this or other products, entertaining items adapted to engage and retain interest, pictures, alphanumeric information or any other information that the manufacturer feels appropriate. The inventive tape can also be color coded to indicate the product category of the product contained within the package or the actual product within the box. Where a particular color indicates a category of products, in accordance with the invention, one may use differing shades or hues of the same color for each particular product or subgroup of products. The color coding can also identify which product line the contents of the package is from.

Another function of the inventive tape is to convey advertising information about differing products to the purchaser of the product contained within the package. The purchaser may or may not be aware of the different accessories, features, or other lines of products carried by the manufacturer. Therefore when the purchaser receives the product contained within a package utilizing the inventive tape, he or she is made aware of other products that may also be useful in their endeavors.

By using tape imprinted with information the manufacturer can provide an attractive shipping container, which contains all of the advantages of a printed box, without having the any drawbacks that are associated with printed boxes.

BRIEF DESCRIPTION OF THE DRAWINGS

One way of carrying out the invention is described in detail below with reference to drawings which illustrate only one specific embodiment of the invention and in which:

FIG. 1 is a top plan view of a section of tape made in accordance with the present invention;

FIG. 2 is a cross-sectional view of the tape of FIG. 1;

FIG. 3 is a perspective view of the tape of the present invention in the form of a roll for easy dispensing and use;

FIG. 4 is a perspective view of the tape of the present invention partially unrolled;

FIG. 14 is a top plan view of yet another alternative embodiment of the present invention; and FIGS. 15–16 illustrate alternative tapes useful with the method of the present invention.

DETAILED DESCRIPTION

Figure 5:
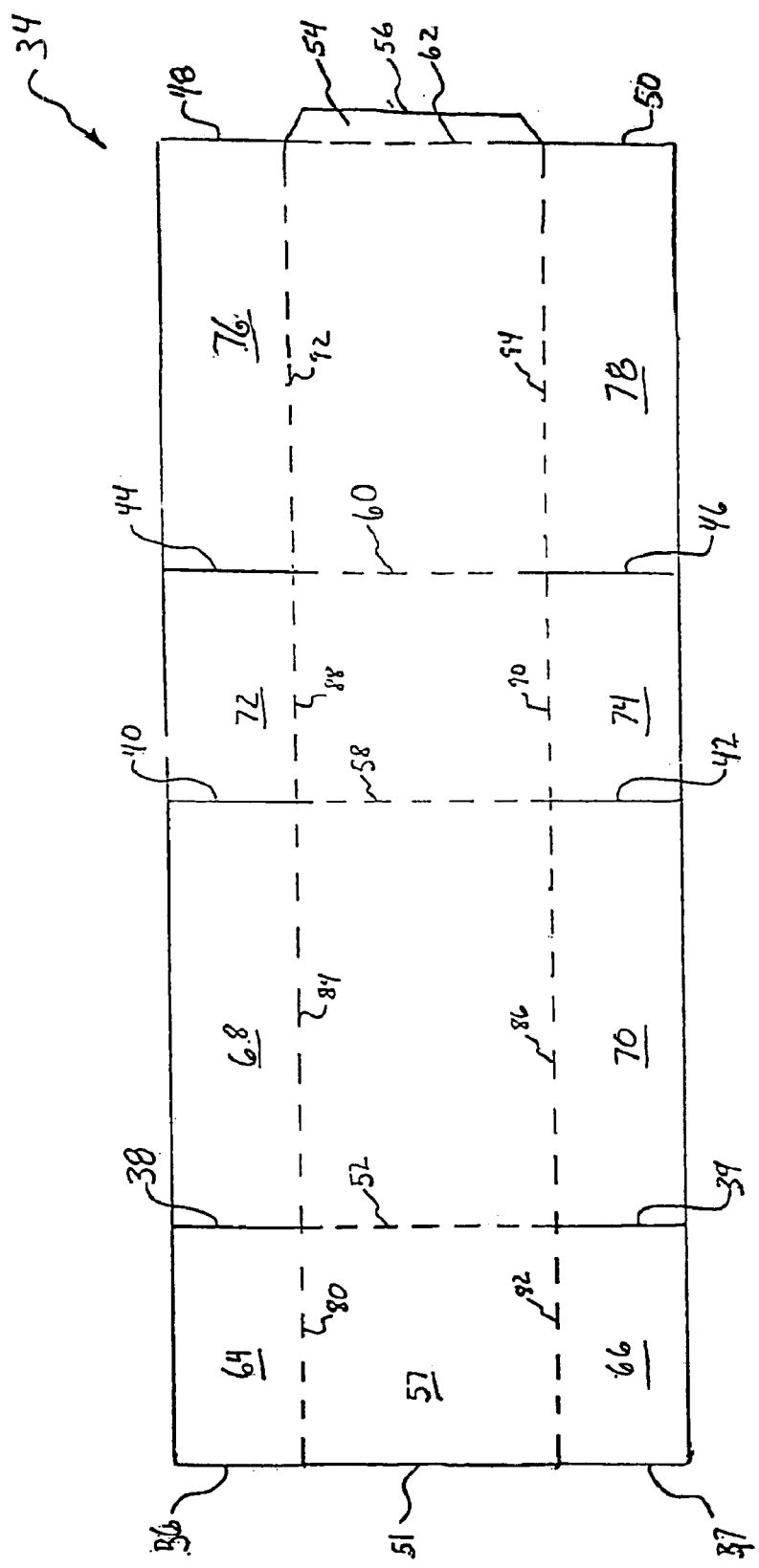
FIG. 5 is a plan view of a cardboard cutout, useful for making the inventive shipping container, prior to assembly.

Referring to FIG. 1, the inventive method uses a section of tape 10 in accordance with the packaging system of the present invention. In particular, tape 10 comprises a long planar member 12, which can be constructed out of paper, plastic or any other suitable material, imprinted with various types of information consisting of pictures 14, alphanumeric information 16 and other material 18.

The construction of tape 10 may be seen more clearly with reference to FIG. 2. In particular, tape 10 comprises, in accordance with the preferred embodiment, a paper planar member 12. Typically, planar member 12 will have a width in the range between 1 and 10 centimeters, or any width typical of adhesive tape products commonly on the market today.

As can be seen clearly in FIG. 2, tape 10 has a top surface 20. Ink 22 is deposited on top surface 20 to form the various items of printed matter on tape 10, such as pictures 14, alphanumeric information 16, and other material 18. The underside of planar member 12 is covered by a layer of adhesive 24. Adhesive 24 may be any suitable adhesive employed in the packaging tape art, such as a water activated adhesive, or a self-adhesive material of the type which merely has to be removed from the roll before use, as in the case of ordinary transparent tape, where the user must merely unroll the tape which he wishes to use and press it against the surface to which it is to be adhered.

As is illustrated in FIG. 3, tape 10 may be put in the form of a conventional roll 26, for convenient application of tape 10. Roll 26 is formed by wrapping tape 10 on a hard cardboard spool 28 in a manner conventional to the packaging tape industry. In order to make an unused role of tape 26 easy for the user to start, the underside of the end 30 of tape 10 on roll 26 is provided with a paper or paperboard member 32, as illustrated in phantom lines in FIGS. 2 and 3, which prevents it from sticking to the rest of the roll. Such structures are well known in the art, and typically consist of adhesion of member 32 to a water activated tape, or by adherence of member 32 to a portion of adhesive exposed at the end of a roll of self-adhesive tape. This allows tape 10 to easily unroll as is illustrated in FIG. 4.

In accordance with the present invention, it is anticipated that the inventive tape 10 will be used with relatively conventional packages, such as a conventional corrugated cardboard box of the type illustrated in FIGS. 5–11. In FIG. 5 corrugated cardboard member 33 to be formed into box 34, is shown prior to assembly. As illustrated, corrugated cardboard member 33 is cut along solid lines 36, 37, 38, 39, 40, 42, 44, 46, 48, and 50 in order to form flaps 64, 66, 68, 70, 72, 74, 76, and 78. Box 34 is also scored so it can be folded along phantom lines 52, 58, 60, 62, 80, 82, 84, 86, 88, 90, 92, and 94. In addition, securement tongue 54 has been cut out along line 56. This allows glue to be applied to surface 53 between tongue 54 and the overlying surface of panel 57 as shown in FIGS. 6a and 6b. Box 34 is then folded so that the glued portion of tongue 54 and panel 57 come into contact. Box 34 is now in the form as illustrated in FIGS. 6a and 6b.

Figure 6A:
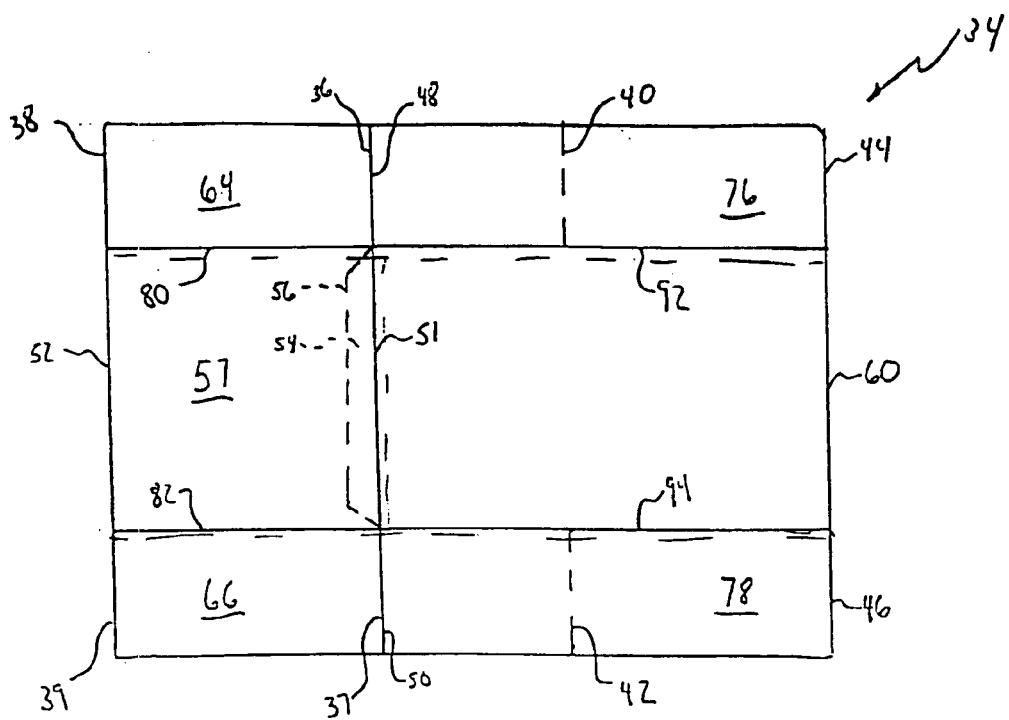
FIG. 6a is a plan view of the top of a partially constructed shipping container utilized in the inventive package and method prior to assembly.
Figure 6B:
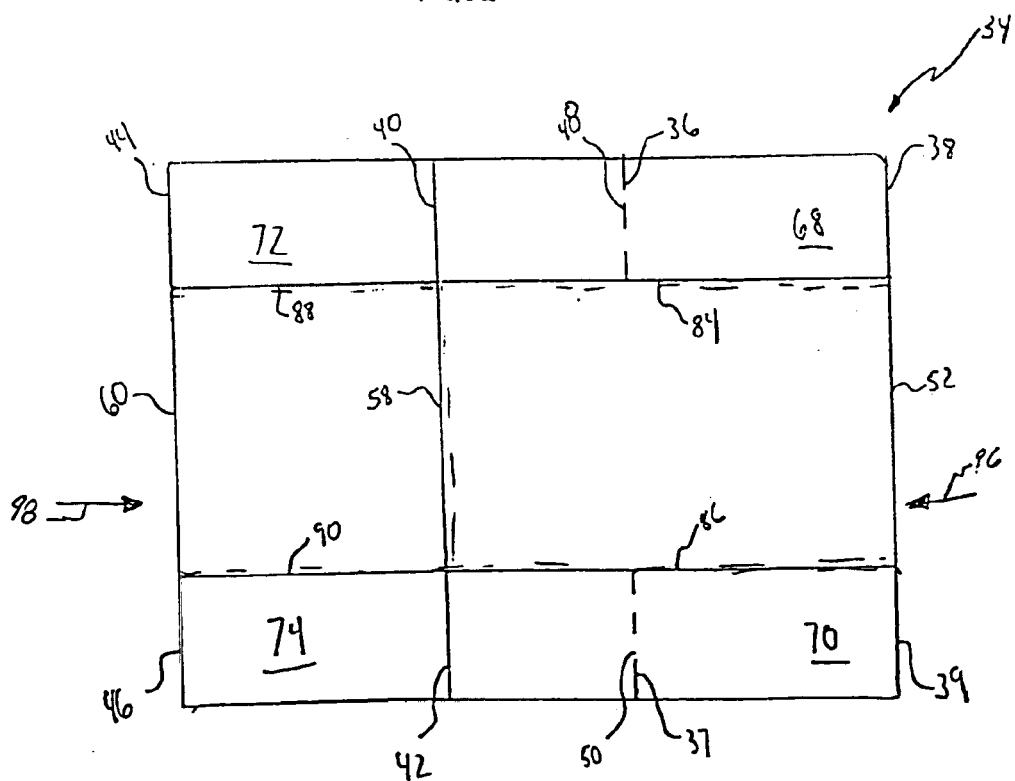
FIG. 6b is a plan view of the bottom of the shipping container of FIG. 6A.

Generally, corrugated cardboard box 34, is shipped from the manufacturer in a partially constructed state as illustrated on one side in FIG. 6a and on the reverse side in FIG. 6b. Corrugated cardboard box 34 is then assembled and packed by the company wishing to employ the inventive tape and method.

Figure 7:
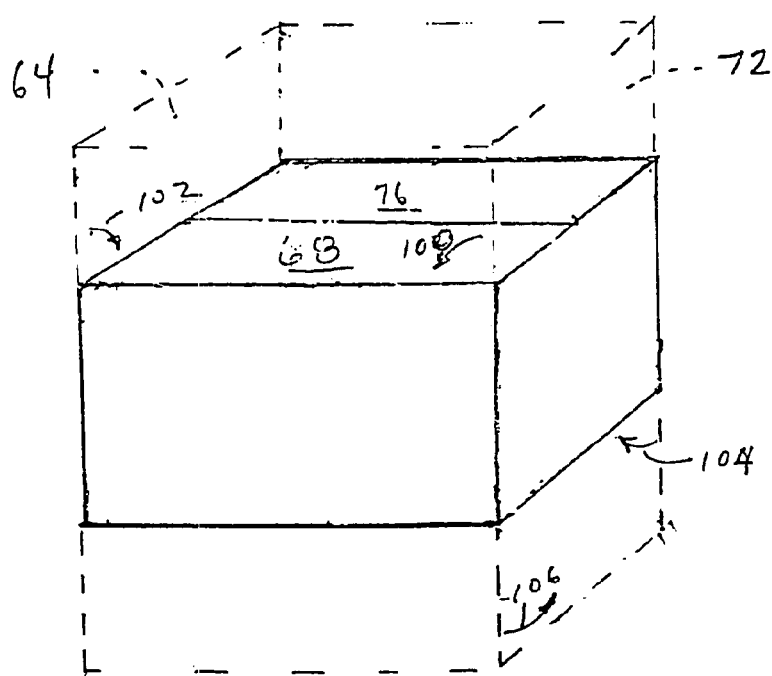
FIG. 7 is a perspective view illustrating a shipping container assembly in accordance with the inventive system.

Fabrication of box 34 both in the partially constructed flat state as illustrated in FIGS. 6a and 6b and in the final assembled state, as illustrated in FIG. 7, is accommodated by providing the box with scoring along lines 52, 58, 60, and 62. These scoring lines allow formation of the box into a rectangular tubular form. Closing of its flaps 64, 66, 68, 70, 72, 74, 76, and 78 is accommodated by the scoring along lines 80, 82, 84, 86, 88, 90, 92 and 94, respectively. During assembly of corrugated cardboard box 34 into the flat state illustrated in obverse in FIG. 6*a*, and in reverse in FIG. 6*b*, the corrugated cardboard sheet, after the scoring has been done, is folded along lines 58 and 60.

When it is desired to construct a box in accordance with the method of the present invention, in order to form the inventive shipping container, one first takes the container in the standard partially constructed flat shape, as illustrated in FIGS. 6*a* and 6*b*, and compresses it into a tubular shape by the application of force in the direction indicated by arrows 96 and 98 through the folds along lines 52 and 60, respectively. This causes the obverse and reverse of the flat box to reform along lines 51 and 58, respectively. The application of force in the directions indicated by arrows 100, 102, 104 and 106, allows one to then depress the flaps from the position shown in phantom lines in FIG. 7 to the final constructed positions shown in solid lines.

More particularly, flap 74 is folded in the direction of arrow 104. Flap 66 is then folded down in the direction of arrow 106. Next flaps 78 and 70 are folded to complete the bottom of the box.

Figure 8:
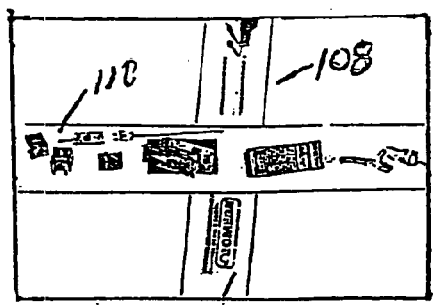
FIG. 8 is a plan view of the bottom of the shipping container showing the inventive adhesive tape during implementation of the preferred embodiment of the inventive method.
Figure 9:
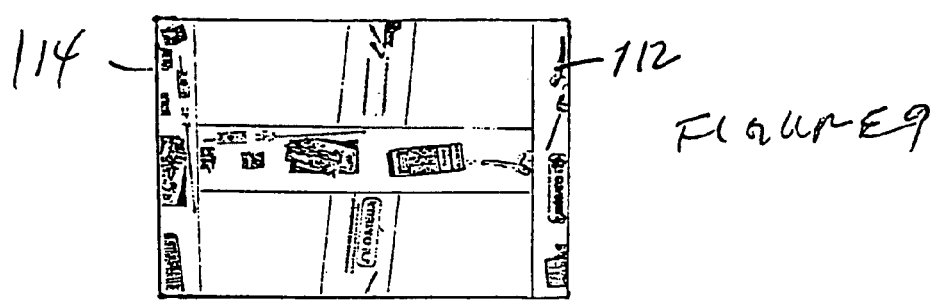
FIG. 9 is a plan view of the bottom of the inventive shipping container.

It then becomes necessary to form the bottom of the box by applying a piece of tape 108 crosswise, as illustrated in FIG. 8. Next a piece of tape 110 is applied to the carton lengthwise. The edges of the carton are then closed as illustrated in FIG. 9. This is achieved by application of pieces of tape 112 and 114, along the sides of the box.

In accordance with the preferred embodiment of the present invention, all tape used to perform the sealing of the carton is tape 10, which is imprinted with information in accordance with the present invention.

Once this has been done, the carton may be packed in a conventional manner. Such packing may be achieved with the use of dedicated packing materials, such as molded foam plastic elements, fitted to the shape of the particular item being packed. Alternatively, shredded paper, foam plastic "peanuts", or any other appropriate expedient may be used.

After this is done, the package is ready to be closed, and flap 72 is folded in the direction indicated by arrow 100 along score line 88. Similarly, flap 64 is folded along score line 80 in the direction indicated by arrow 102. Flaps 68 and 76 are then folded into the positions shown in solid lines in FIG. 7.

Figure 10:
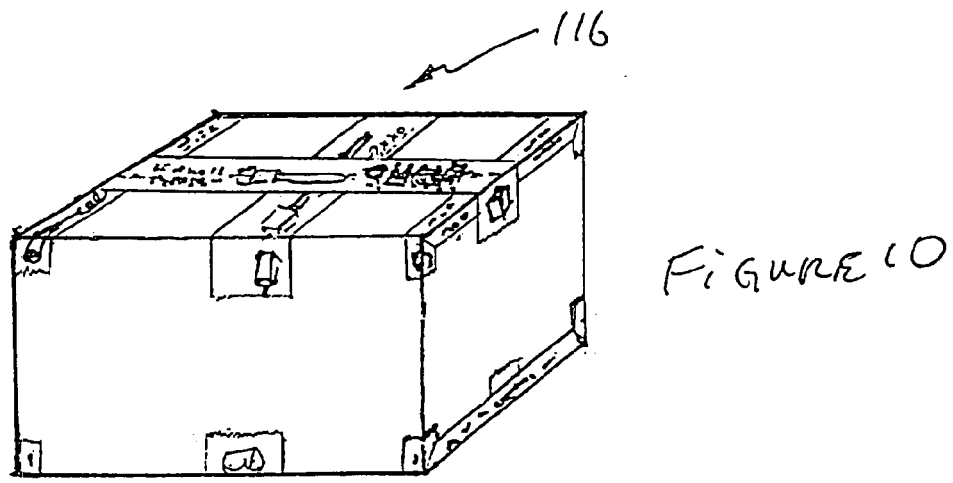
FIG. 10 is a perspective view of the inventive shipping container.

It is then necessary to finish the packaging operation by applying tape of the type illustrated in FIG. 1 to the top of the corrugated cardboard carton using the application steps illustrated in FIGS. 8 and 9. The result is a finished package 116 constructed in accordance with the present invention, as illustrated in FIG. 10.

While the above discussion has centered on the use of paper and plastic tapes, it is to be understood that the invention is applicable to tapes of all sorts and varieties known and as may be discovered in the future. Such tapes include nylon reinforced tape, asphaltic tape, paper tapes reinforced with crosswise, lengthwise and diagonal nylon members, plastic tapes reinforced with lengthwise nylon threads, and so forth.

Because of the use of the inventive tape, such as the tape illustrated in FIG. 1, in the fabrication of the inventive package 116, the inventive package 116 has numerous advantages over conventionally packaged products. In particular, this package has advertising on it. The advertising is keyed to the particular product contained within inventive package 116. In addition, the information on the tape, illustrating products as it does, also gives information about the type of product inside. It thus acts as a means for insuring that the particular carton containing a particular product is kept in its place, for example, in a warehouse, or the like. Such identification is particularly easy to see due to the use of color and numerous other features which may be used extensively on the inventive tape.

In order to better understand the above advantages of the inventive packing tape and packages, such as finished container 116 embodying the package of the present invention, reference is made to FIG. 1.

The inventive tape 10 includes a number of illustrations of products in a given product family. These illustrations 118 are illustrations of products that are in the same product family as the contents of finished container 116. In accordance with the preferred embodiment, illustrations 118 are in full color in order to convey product information and also serve as advertising. The particular products which are in illustrations 118 are selected because they not only identify a particular product family and thus serve to mark finished packages for purposes of inventory control, but also for advertising purposes, insofar as purchasers of products of the type contained within the finished container 116 are highly likely to purchase products of the type shown in illustrations 118.

In addition, the inventive tape may be color-coded by having a colored background 120. However as illustrated in FIG. 1, background 120 is white and color coding is provided by squares of color 122 adjacent illustrations of products 124. Additional advertising value is provided by marking the inventive tape with the name of a manufacturer as illustrated by company name 126 and company logo 128. The inventive tape may also be marked with an alphanumeric indication of the product family as illustrated by marking 130. It is also possible for the inventive tape to serve as a device for indicating whether or not the package has been tampered with and advising the customer of the same via the alphanumeric advice 16 which reads:

"If Seal on Tape is Broken-Please Do Not Accept Package"

Figure 11:
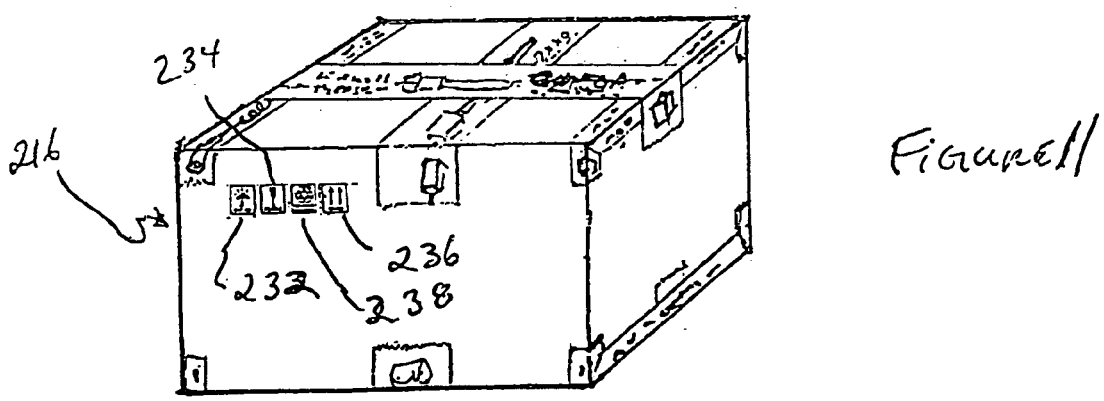
FIG. 11 is a perspective view of an alternative embodiment of the inventive shipping container.

An alternative embodiment is illustrated in FIG. 11. Generally, similar parts or parts performing analogous, corresponding or identical functions to those of the FIG. 10 embodiment are numbered herein with numbers which differ from those of the earlier embodiment by multiples of one hundred.

In accordance with the present invention, it is anticipated that plain brown corrugated cardboard boxes may be used. In accordance with the preferred embodiment, a corrugated cardboard box with a white paper veneer is employed. While the box may be completely unprinted, in accordance with one embodiment of the invention, the finished package 216, illustrated in FIG. 11, includes a number of graphic devices conveying warnings. These graphic devices are imprinted on the flat corrugated carton while it is in the form illustrated in FIGS. 6*a* and 6*b* with respect to an unprinted corrugated cardboard carton. More particularly, as illustrated in FIG. 11, the corrugated cardboard box is imprinted with graphic devices which include a water hazard warning device 232, a fragility warning device 234, an orientation warning device 236, and a device 239 indicating the recyclability of the carton.

Figure 12:
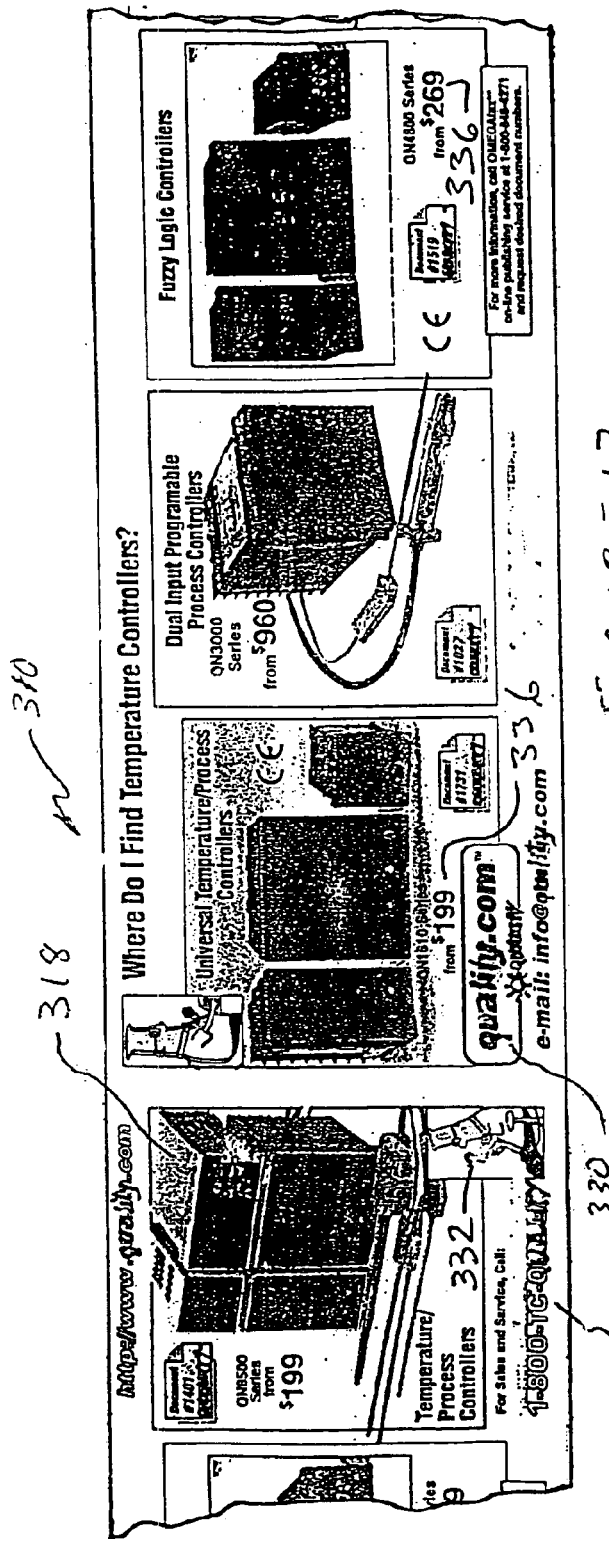
FIG. 12 is a top plan view of an alternative embodiment of the tape of the present invention.

Referring to FIG. 12, yet another embodiment of the invention is illustrated. In this embodiment, the inventive tape 310 has illustrations 318 showing products of the type that will be enclosed in the inventive package. Likewise, tape 310 includes such things as the web address of a company 330, and illustrations of a cartoon spokesperson 332 and an 1-800 number 334 for the company using the tape, or any other company information such as an electronic address. In addition, tape 310 includes product pricing indicia 336, and thus can function as a catalog. If desired, the tape can also be printed in full color for added impact as an advertising medium. In addition, it is noted that as an advertising medium, the tape need not be keyed in its product offering content to the products on the inside of the finished box. However, it is believed that such tapes, will be most effective as an advertising medium when the products illustrated on the tape bear a commercial relationship to the products inside the package on which the tape is used.

Figure 13:
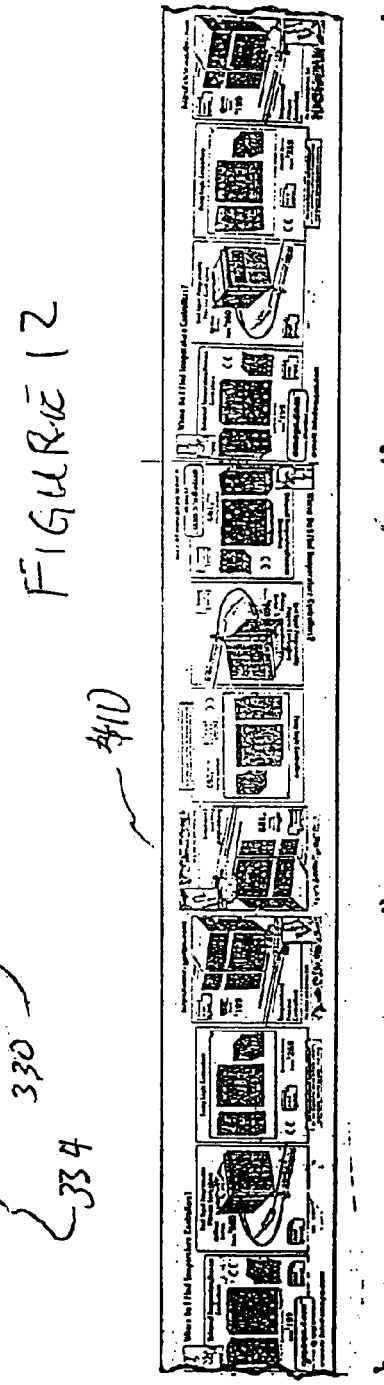
FIG. 13 is a top plan view of another alternative embodiment of the tape of the present invention.

An alternative version of the type of tape illustrated in FIG. 12, is illustrated in FIG. 13. In this embodiment tape 410 has a content similar to that of tape 310, except that such content is divided into cells 438 and 440. As can be seen in FIG. 13, cells 438 are oriented in one direction, while cells 440 are oriented in the opposite direction. Cells 438 alternate with cells 440 along the entire length of the tape, thus resulting in a tape which is readable regardless of its orientation.

Still yet another embodiment of the present invention is illustrated in FIG. 14. In this embodiment, the invented tape 510 has many of the features of the tapes illustrated in the earlier embodiment's. However, the tape also includes a cartoon strip 542. Cartoon strip 542 in accordance with the present invention, is contemplated as having a content related to the particular product enclosed in the package. In the context of present invention, it is also contemplated that the cartoon strip will have a humorous content. For example, if the contents of the package constitutes engineering instrumentation, it is anticipated that the cartoon strip will feature humorous subject matter dealing with engineers.

Thus, in accordance with the invention, the humorous content of the comic strip is selected for its appeal to the anticipated readers. In addition, humor is known for its physiological effects. These effects are known to be positive. Generally, these effects involve the release of chemicals in the brain which promote a feeling of well-being, as well as a positive outlook. The combination of these pleasurable sensations and the messages contained on the tape, respecting the products of the person using the tape as advertising, will cooperate to result in particularly effective advertising.

The tape 510, as illustrated in FIG. 14 is also divided into a number of cells. Each of the cells is divided into parts. The first of these parts is a comic strip part 544, while the second part is an advertising portion 546. The comic strip portion and the advertising portion are within a single cell 550, and are oriented in the same direction. The cells are then arranged in a repeating sequence along the entire length of the tape, alternately oriented in one direction and then in the opposite direction. This ensures that when the tape is viewed on a package, regardless of the orientation of package, the tape will be readable.

Still yet another embodiment of the present invention is illustrated in FIG. 15. In this embodiment, the inventive tape 610 has many of the features of the tapes illustrated in the earlier embodiments. The tape includes a cartoon strip portion 642, and an advertising portion 646. The cartoon strip portion 642 comprises a series of related cartoon cells 644. Each of the cells 642 contains one or a number of different characters. In the case of the embodiment illustrated in FIG. 15, this character or characters are in fact, and are intended to be in accordance with the present invention characters who are well-known to the general public. Thus, the strip is calculated to engage the attention of persons familiar with such well-known character or characters and who are, to varying extents, fans of such character or characters. When read from start to finish the cartoon strip has a story line, and provides an enjoyable, humorous and entertaining encounter for the reader. In addition, as in the previous embodiments, the story line is related to the work of the individuals who are the targeted consumers for the advertising material on the tape.

The tape 610 illustrated in FIG. 15 has yet another feature which is calculated to dramatically increase response. In particular, advertising portion 646 advertises of the availability for free of a plurality of books 647 including valuable information of a scientific nature. Books 647, which are also well-known to members of the consuming public, include information on various fields of technology such as pressure measurement, load measurement, data acquisition, temperature measurement and control, environmental monitoring, fluid handling, signal conditioning, and the like. Each of these fields are illustrative of the fields which may be covered by various books 647. Books 647 also include numerous products useful in the fields to which they are devoted.

As a result, persons seeing these books and the telephone number 649 are likely to be induced to call the telephone number and request the books. This has two good effects. Firstly, information will be given to the engineers who order these books, enabling them to more efficiently and better perform their duties. In addition, information is arranged in the books in such a way that the particular products particularly relevant to the particular scientific topics being explained are in close proximity, thereby increasing the likelihood that an engineer in possession of such a book and working on a problem related to back covered in the book will purchase the required products from the book, which thus also serves as a catalog.

The information in the books can, in addition to serving as a scientific text, also function as more than a simple catalog. In particular, it can also provide detailed information on some or all company product lines. This information can include specific features and specifications of the products, as well as scientific and technical manuals.

The tape 610, as illustrated in FIG. 15, also provides the observer with other useful information. This information can consist of a web or Internet address 630, an e-mail address 632, an 800 number 634, and the company's address 636. All of the preceding characteristics provide the reader with avenues to obtain more information on the particular company or products of interest. This method of advertising can be particularly useful, in that the cartoons strip may attract the readers interest. In addition, while reading the cartoons other information about the company is within the peripheral vision of the reader.

FIG. 16 depicts a packaging tape 710 with a printed cell 711 which contains illustrations of books which also function as catalogs of the type illustrated by books 647 in FIG. 15. In this case, however, instead of the books being depicted one against the other with barely more than their spines showing, each of the books 747 is illustrated with its cover in full view. In addition, information respecting technical scientific information, as well as products, is detailed in area 753 for each of the books 747. Finally, there is illustrated a brochure 755, which details information of all publications such as books 747 available from the company using the tape as an advertising device. Also, as in the case of the tape of FIG. 15, the tape of FIG. 16 includes a company name or names, in this case Omega and Newport. This information can consist of a web or Internet address 730, an e-mail address 732, a telephone number 734, and the company's address 736. All of the preceding characteristics provide the reader with avenues to obtain more information on the particular company or products of interest.

INDUSTRIAL APPLICABILITY

The present invention is particularly suitable for application to modern industrial shipping techniques. In accordance with the present invention, it is possible to distribute advertising material to very narrowly targeted potential customers. This is achieved by including tape bearing advertising material. The advantage of this method is that since one knows the exact nature of at least one particular product being ordered by the customer, a very good judgment can be made with respect to what other products that customer is likely to buy, and the name can be advertised on the tape used to seal the package customizing the product.

Thus, in accordance with the method of the invention, advertising can be very effectively distributed to existing customers of an organization by determining the nature of products to be shipped to a customer at a particular point in time, and using this information to identify a product category within which the product to be shipped belongs. Once this product category is determined, other products within the product category may be determined. Because these products are in the same category, it is likely that the customer receiving a particular product being shipped is also likely to purchase other products within the category.

Pictures or other information on other products in that category can then be obtained and applied to packing tape in accordance with the invention. When the time comes to ship the particular product, the tape depicting products in the same category as the product being shipped is then used to assemble and seal the package. In accordance with the invention, it is contemplated that there will be numerous different tapes used in an organization for different categories of products. By selecting a particular tape for use in assembling and sealing a corrugated cardboard carton, the package thus bears a tape which serves the dual function of highly targeted advertising and providing a visual indication which helps keep the particular product in the proper area during warehousing and handling.

While an illustrative embodiment of the invention has been described above, it is, of course, understood that various modifications will be apparent to those of ordinary skill in the art. Such modifications are within the spirit and scope of the invention, which is limited and defined only by the appended claims.

What is claimed is:

1. A method of advertising products related to a product shipped in a box, comprising:
   (a) obtaining a box;
   (b) placing a product in the box;
   (c) identifying a particular product category associated with the product being shipped in the box;
   (d) obtaining an elongated flexible planar member having a width and a length, said length being substantially greater than said width, said planar member having an upper surface and a lower surface;
   (e) providing said flexible planar member with a layer of adhesive material deposited on and covering a substantial portion of said lower surface to form a packaging tape;
   (f) imprinting on said tape indicia comprising visually perceivable information to provide a purchaser with information relating to various products within said particular product category by disposing said information on said upper surface of the tape; and
   (g) sealing the box with the tape.

2. An advertising method according to claim 1 wherein said tape is adhered to said box to cause said box to retain a desired shape.

3. An advertising method according to claim 1 wherein said tape is put on after the product placed in the box.

4. A method as in claim 1, wherein said information relating to various products within said particular product category describes how to obtain said products in said category.

5. An advertising method according to claim 1 further comprising applying said indicia of information indicating the contents of said package.

6. An advertising method according to claim 1 wherein said indicia are color coded to denote category.

7. An advertising method according to claim 1 further comprising applying indicia illustrating a plurality of products related to the products contained within said carton.

8. An advertising method according to claim 1 further comprising applying indicia illustrating accessories to the product contained within said carton.

9. An advertising method according to claim 1 wherein said tape has a specific color, and said specific color identifies the product category of the product contained within said carton.

10. A method of advertising according to claim 1 further comprising printing said tapes with entertainment material designed to engage and entertain a person viewing the tape, and guide said person to real said visually perceivable information.

11. A method of advertising according to claim 1 wherein said step of applying visual indicia consists of generating entertainment material in a two dimensional graphical format, and applying the same to said planar member.

12. A method of advertising according to claim 1 further comprising applying indicia giving an electronic address of a source for said pictured products.

13. A method of advertising according to claim 1 wherein said indicia communicates product features of items within the product category with which the product contained within said package.

14. A method of advertising according to claim 1 further comprising organizing said indicia into cells and printing said cells with different orientations to provide for readability with different orientations of said tape.

15. A method as in claim 1, wherein said particular product category includes products likely to be used by a purchaser of the product.

16. A method as in claim 1, wherein said visually perceivable information contains information on how to order a publication with technical information relating to said product category, and further comprising:
   (h) transmitting said visually perceivable information to the purchaser by shipping said box to said purchaser;
   (i) receiving from said purchaser a request for said publication; and
   (j) transmitting a publication with technical information relating to said product category and information respecting products in said product category to said purchaser.

17. A method as in claim 16, wherein said publication are published paper books.

18. A method of advertising according to claim 16, further comprising printing said tapes with entertainment material designed to engage and entertain a person viewing the tape, and guiding said purchaser to read said visually perceivable information.

19. A method as in claim 1, wherein said visually perceivable information contains information on how to order a publication with technical information relating to said product category, and further comprising:
   (h) transmitting said visually perceivable information to the purchaser by shipping said box to said purchaser;
   (i) said purchaser transmitting a request for said publication;
   (j) receiving from said purchaser said request for said publication;
   (k) transmitting a publication with technical information relating to said product category and information respecting products in said product category to said purchaser;
   (l) said purchaser transmitting an order for a product in said product category; and
   (j) receiving said order for a product in said product category from said purchaser.

20. A method as in claim 1, wherein said information relating to various products within said particular product category describes how to obtain publications with technical information on products related to said product in said box.

21. A method of advertising products related to a product shipped in a box, comprising:
   (a) obtaining a box;
   (b) placing a product in the box;
   (c) identifying a particular product category associated with the product being shipped in the box;
   (d) obtaining a first elongated flexible planar member having a width and a length, said length being substantially greater than said width, said first planar member having an upper surface and a lower surface;
   (e) providing said first flexible planar member with a layer of adhesive material deposited on and covering a substantial portion of said lower surface to form a first packaging tape;
   (f) imprinting on said first tape indicia comprising visually perceivable information to provide a purchaser with information relating to various products within said first particular product category by disposing said information on said upper surface of the tape;
   (g) obtaining a second elongated flexible planar member having a width and a length, said length being substantially greater than said width, said second planar member having an upper surface and a lower surface;
   (h) providing said second flexible planar member with a layer of adhesive material deposited on and covering a substantial portion of said lower surface to form a second packaging tape;
   (i) imprinting on said second tape indicia comprising visually perceivable information to provide a purchaser with information relating to various products within said second particular product category by disposing said information on said upper surface of the tape;
   (j) selecting said first tape or said second tape as more relevant to said product in said box; and
   (g) sealing the box with the selected tape.

22. A method of advertising products likely to be used by a purchaser of a product shipped in a box, comprising:
   (a) obtaining a box;
   (b) placing a product in the box;
   (c) identifying a particular product category associated with the product being shipped in the box;
   (d) obtaining an elongated flexible planar member having a width and a length, said length being substantially greater than said width, said planar member having an upper surface and a lower surface;
   (e) providing said flexible planar member with a layer of adhesive material deposited on and covering a substantial portion of said lower surface to form a packaging tape;
   (f) providing indicia comprising visually perceivable information to the purchaser describing books with general information related to products in the particular product category and information on how to obtain various products within said particular product category by disposing said information on said upper surface of the tape; and
   (g) sealing the box with the tape.

23. A packaging tape system, comprising:
   (a) a first packaging tape adapted to be used to structurally stabilize the form of a package containing a product, and to close the package, comprising:
      (i) an elongated flexible planar member having a width and a length, said length being substantially greater than said width, said planar member having an upper surface and a lower surface;
      (ii) a layer of adhesive material disposed on and covering a substantial portion of said lower surface;
      (iii) printed indicia disposed on said upper surface, said indicia bearing visually perceivable information describing books containing product information on products in a particular product category and information useful in the employment of products in said product category;
   wherein said first packaging tape is color coded with a first color, and said first color identifying a first product group; and
   (b) at least one additional packaging tape adapted to be used to structurally stabilize the form of a package containing a product, and to close the package, comprising:
      (i) an elongated flexible planar member having a width and a length, said length being substantially greater than said width, said planar member having an upper surface and a lower surface;
      (ii) a layer of adhesive material disposed on and covering a substantial portion of said lower surface;
      (iii) printed indicia disposed on said upper surface, said indicia bearing visually perceivable information describing books containing product information on products in a room second particular product category and information useful in the employment of products in said second product category;
   wherein said additional packaging tape is color coded with a different color, different from the colors of said first packaging tape in said tape system, and said different color identifying the product contained within said package as coming from another product group, different from product groups associated with the tapes associated with other packaging tape in said tape system.

24. A system as in claim 23 further comprising at least two packages, one of said packages having said first packaging tape disposed thereon, and the other of said packages having said additional tape disposed thereon, said packages containing products from the product groups associated with their respective tapes.

25. A packaging tape as in claim 23, wherein said indicia includes an electronic address of a source for said pictured products.

26. A packaging tape as in claim 23, wherein said indicia are organized in cells with different orientations to provide for readability with different orientations of said tape.

27. A packaging tape as in claim 23, wherein said indicia conveys information on products within the same line of products as the product contained within said package.

28. A method of packaging a product, comprising the steps of:

(a) determining the nature of the product;

(b) determining the product category within which said product is classified;

(c) identifying other products within said product category;

(d) putting said product in a carton formed by using an adhesive tape with visual indicia on one side of said tape and an adhesive disposed on the other side of said tape, said visual indicia describing books which have information on other products within said product category, said finished packaging tape being applied to said carton in such a manner as to cause said carton to retain its shape.

29. A method as in claim 28, wherein said visual indicia are contained in cells oriented in different directions to provide for viewing with different carton orientations.

* * * * *